United States Patent
Gotmalm (10) Patent No.: US 11,198,345 B2
(45) Date of Patent: Dec. 14, 2021

(54) METHOD AND APPARATUS FOR COOLING AND HEATING IN A VEHICLE

(71) Applicant: INPS ENVIRONMENTAL PRODUCTS INC., London (CA)

(72) Inventor: Christer Gotmalm

(73) Assignee: INPS ENVIRONMENTAL PRODUCTS INC., London (CA)

( * ) Notice: Subject to any disclaimer, the term of this patent is extended or adjusted under 35 U.S.C. 154(b) by 234 days.

(21) Appl. No.: 15/779,367

(22) PCT Filed: Nov. 24, 2016

(86) PCT No.: PCT/CA2016/051377
§ 371 (c)(1),
(2) Date: May 25, 2018

(87) PCT Pub. No.: WO2017/088056
PCT Pub. Date: Jun. 1, 2017

(65) Prior Publication Data
US 2018/0319247 A1    Nov. 8, 2018

(30) Foreign Application Priority Data
Nov. 27, 2015 (CA) .................................. CA 2913473

(51) Int. Cl.
*B60H 1/00*    (2006.01)
*B60H 1/32*    (2006.01)
*B61D 27/00*   (2006.01)
*B61C 17/04*   (2006.01)

(52) U.S. Cl.
CPC ..... *B60H 1/00378* (2013.01); *B60H 1/00207* (2013.01); *B60H 1/00428* (2013.01);
(Continued)

(58) Field of Classification Search
CPC ............ B60H 1/00378; B60H 1/00207; B60H 1/00428; B60H 1/00542; B60H 1/3226;
(Continued)

(56) References Cited

U.S. PATENT DOCUMENTS 3,817,054 A * 6/1974 Adams ................. B60H 1/3229
                                                          62/243
3,906,740 A * 9/1975 Thomas ................ F24F 1/027
                                                          62/239
(Continued)

FOREIGN PATENT DOCUMENTS

CA        1015165 A      8/1977
FR        2593122 A1 *   7/1987   ............ F25B 31/023
(Continued)

OTHER PUBLICATIONS

International Preliminary Report on Patentability of PCT/CA2016/051377, dated Jun. 7, 2018.

*Primary Examiner* — Tho V Duong
(74) *Attorney, Agent, or Firm* — Erickson Kernell IP, LLC; Kent R. Erickson (57) ABSTRACT

According to some embodiments, there is provided an air conditioning system for a vehicle. The vehicle may be a locomotive. The air conditioning system includes a combination module for mounting in or on a vehicle. The combination module includes a condenser coil and a compressor assembly. The compressor assembly includes an electric motor. The combination module may be mounted to cover a hole in an outer wall or floor of the vehicle, such that air enters the hole ventilates the condenser coil. The system also includes at least one air handler for mounting in a cab of the vehicle, remote from combination module. Each air handler comprises a respective evaporator coil. A combination module including a compressor assembly is also provided. A (Continued)

method for installing the combination module is also provided.

30 Claims, 7 Drawing Sheets

(52) U.S. Cl.
CPC ......... B60H 1/00542 (2013.01); B60H 1/323 (2013.01); B60H 1/3226 (2013.01); B60H 1/3229 (2013.01); B61C 17/04 (2013.01); B61D 27/0018 (2013.01); B61D 27/0027 (2013.01); B60H 2001/3292 (2013.01); Y02T 10/88 (2013.01)

(58) Field of Classification Search
CPC ...... B60H 1/3229; B60H 1/323; B61C 17/04; B61D 27/0018; B61D 27/0027; F28D 7/026; F28D 7/024; F28D 7/022; F28D 7/028
See application file for complete search history.

(56) References Cited

U.S. PATENT DOCUMENTS

| | | | | |
|---|---|---|---|---|
| 4,098,093 | A | * | 7/1978 | Czyl .................... B60H 1/3226 62/243 |
| 2005/0092005 | A1 | | 5/2005 | Webasto |
| 2006/0248904 | A1 | * | 11/2006 | Ludwig ................ B60H 1/3232 62/151 |
| 2007/0295017 | A1 | * | 12/2007 | Pannell .............. B60H 1/00428 62/236 |
| 2008/0307820 | A1 | * | 12/2008 | Ingram .............. B60H 1/00907 62/324.6 |
| 2010/0191416 | A1 | * | 7/2010 | Yamaguchi ........ B60H 1/00828 701/36 |
| 2011/0030406 | A1 | * | 2/2011 | Ichikawa ........... B60H 1/00378 62/244 |
| 2012/0297820 | A1 | | 11/2012 | Masuda et al. |
| 2014/0230463 | A1 | * | 8/2014 | Ziehr ................... F25B 49/025 62/56 |
| 2015/0211802 | A1 | * | 7/2015 | Yokozeki ................ F28F 1/325 165/104.14 |
| 2015/0291008 | A1 | * | 10/2015 | Seto ........................ B60L 58/26 62/208 |
| 2016/0129760 | A1 | * | 5/2016 | Mirzaei ................ B60H 1/3211 62/183 |

FOREIGN PATENT DOCUMENTS

| | | | | |
|---|---|---|---|---|
| WO | WO-0050826 | A1 | * 8/2000 | ............ F25B 41/062 |
| WO | 01/87656 | A1 | 11/2011 | |

* cited by examiner

METHOD AND APPARATUS FOR COOLING AND HEATING IN A VEHICLE

RELATED APPLICATION

This application claims priority to Canadian Application Serial No. 2,913,473 filed Nov. 27, 2015, the entire contents of which are incorporated herein by reference.

FIELD OF THE DISCLOSURE

Aspects of the disclosure relate to air conditioning systems for vehicles, such as locomotives. More particularly, aspects relate to split system air conditioning systems.

BACKGROUND

Air conditioners are becoming more common in locomotives. One reason for this is union demand for better work conditions. Another reason is safety. It is now recognized that long exposure to high temperatures can have considerable negative effects on a driver's alertness. For example, temperatures of 100 degrees F. may be common in the cab of a locomotive without air conditioning. As there are approximately 50 000 locomotives in the Americas, but only about 1000 new locomotives built per year, most air conditioners are retrofitted in locomotives that were not originally designed around the air conditioning equipment to be installed. This retrofitting is costly and time consuming and is commonly a source for leakage from the elements into the vehicle as well as into the air conditioner machinery.

A conventional type of air conditioning system for locomotives is a roof-top type system. Frequently installation of a roof-top system requires structural reinforcement of the existing roof. A roof-top air conditioner may, for example, include a 3'×3' wide steel box that is 2.5' high. The box may have multiple compartments/levels within. In a typical design, for example, the floor in an uppermost level must be watertight, despite having conduits and refrigerant lines passing through. The roof-top type air conditioner may have a large circular grill for warm air vented over the condenser to exit. Since the grill is exposed to the weather, rainwater may enter the upper compartment. If and/or when such water leaks into a lower compartment, electric motors, inverters and other electronic parts installed therein will likely be damaged. Among the water-sensitive parts is the inverter, which is typically a large, heavy and expensive device that typically converts a locomotive's 65 to 74 VDC power supply into 220 VAC power to drive the compressor. The cost of a hardened and air-cooled inverter of 5 kW or more for a roof-top air conditioner may be at least ⅓ of the total cost for the air conditioner unit, and the inverter is a common source of trouble. An alternative to an inverter is a direct drive 65 to 74 VDC motor which may be heavy and bulky and may have high demands for maintenance of brushes and commutators. A 65 to 74 VDC power system in a locomotive may provide 65 VDC from batteries that are charged by the engine. When the engine is running, the system may provide 72 VDC while the batteries are being charged and 74 VDC when the batteries are not being charged. For simplicity, such systems will be referred to as 74 VDC systems herein, although it is understood that such systems do not always provide 74 VDC of power as described above.

The lowest compartment of a conventional roof-top air conditioner may typically contain the air-handlers, evaporators and a fan for cooling the air inside the locomotive's cab.

To install the typical roof-top air conditioner in a locomotive, one must make a hole (for example, approximately 3'×3' wide) in the roof above the driver's position. A locomotive cab's roof typically might not be able to bear the weight of the air conditioner by itself. Furthermore, if the roof is curved in shape, it may not seal against the air conditioner unit. When the hole is cut, curved cross-beams placed under the roof on top of the head-liner are often cut off as well. A heavy frame must be assembled, inserted in the hole, and welded to the beam ends. A 9 foot long weld between the frame and the roof must be watertight.

A typical roof-top air conditioning system may be very heavy, with the enclosure/casing of the system being the majority of the weight. When installed on the frame, which requires a crane, a portion of the air conditioner will protrude down into the cab and may, therefore, limit the operator's head room. The remainder of the air conditioner will extend above the roof. This change in the locomotive's profile (making it taller) may make the locomotive more constricted for travel on bridges and in tunnels, even to the point of being unable to pass. This constriction may be particularly problematic in regions, such as the United Kingdom, that have old railway infrastructure. When such constrictions are neglected, collisions may result causing damage to equipment and environment.

Furthermore, access for maintenance and repair in roof-top retrofitted air conditioning systems may be difficult. If maintenance workers must work on or near the roof of the locomotive to access the roof-top unit, there may be a risk of injury from falling. There may also be a risk of electrocution, especially in the case of locomotives running on overhead power lines, when workers must work on the top of a locomotive. Furthermore, overhead power lines for an entire track may need to be shut off before workers perform maintenance on a roof-top system for safety reasons. The internal head room for the locomotive operator may also be restricted, particularly when the apparatus is lowered more into the hole to improve the locomotive's profile.

To mitigate some of the problems with the increased locomotive profile discussed above, split system air conditioners have been used. In conventional split systems, the air-handler/evaporator is installed in the operator's cab, and the compressor assembly is installed somewhere else inside the locomotive. The condenser (including its fan) is typically placed on the outside of the vehicle in such a system. The condenser is then exposed to the outside, and, as a result, the condenser gets wet and dusty. Furthermore, exposing condenser fins to the outside of the train may increase the chance of damage to the fins, which are typically quite thin and easy to bend.

SUMMARY

According to one aspect of the disclosure, there is provided an air conditioning system for a vehicle comprising: a combination module for mounting in or on the vehicle, the combination module comprising: a condenser coil and a compressor assembly, the compressor assembly comprising an electric motor; and at least one air handler for mounting in a cab of the vehicle, remote from combination module, wherein each air handler comprises a respective evaporator coil, each air handler being coupled to the combination module such that refrigerant flows between the air handler and the combination module.

In some embodiments, the combination module is for mounting inside the vehicle to cover a hole in a floor or outer wall of the vehicle, the condenser coil, when mounted, being positioned over the hole such that air enters through the hole ventilates the condenser coil.

In some embodiments, the module is for mounting over the hole in the floor of the vehicle.

In some embodiments, each air handler further comprises a respective fan to move air over the evaporator coil and into the cab.

In some embodiments, the condenser coil extends around the hole and forms a hollow region over the hole for the air to enter into the hollow region.

In some embodiments, the condenser coil is in the shape of an open ended hollow cylinder, wherein a base of the cylinder is positioned over the hole.

In some embodiments, the condenser coil is in the shape of a box with at least one open side, wherein one of the at least one open side of the box is positioned over the hole.

In some embodiments, the air conditioning system further comprises an air intake for mounting outside the vehicle and covering the hole for directing air through the hole and into the combination module.

In some embodiments, the air intake is a ram scoop.

In some embodiments, the vehicle is a locomotive, a truck, or a work vehicle.

In some embodiments, the compressor assembly further comprising a flow controller to control flow of the refrigerant.

In some embodiments, the flow controller of the compressor assembly is a variable speed control coupled to the electric motor.

In some embodiments, the air conditioning system further comprises a sensor for taking air temperature measurements at one of the at least one air handler, the variable speed controller controlling the flow of the refrigerant as a function of the air temperature measurements.

In some embodiments, the air conditioning system further comprises a fan mounted proximate to the hole to move air and into the combination module.

In some embodiments, the air conditioning system further comprises a sensor for taking temperature and/or pressure measurements of the refrigerant near the condenser coil.

In some embodiments, the air conditioning system further comprises a fan controller to selectively activate the fan when it is determined that air flow in the combination module is insufficient as a function of at least one of: said at least one of temperature and pressure measurements; and a speed of the locomotive.

In some embodiments, said at least one of temperature and pressure measurements comprises temperature measurements, and selectively activating the fan comprises activating the fan if a measured temperature of the refrigerant exceeds a temperature threshold.

In some embodiments, said at least one of temperature and pressure measurements comprises pressure measurements, and selectively activating the fan comprises activating the fan if a measured pressure of the refrigerant exceeds a pressure threshold.

In some embodiments, the electric motor comprises DC motor.

In some embodiments, the DC motor is a brushless DC motor.

In some embodiments, the electric motor is configured to be powered by a DC power system of the vehicle.

In some embodiments, the DC power system is one of: a 65 to 74 volt DC system; and a 12 to 24 volt DC system.

In some embodiments, the air conditioning system further comprises a reverse valve that reverses flow of the refrigerant such that the condenser coil functions as an evaporator and the evaporator coil functions as a condenser, to thereby provide heated air to the cab.

In some embodiments, the compressor assembly comprises a compressor, the compressor and the electric motor comprising a common drive shaft.

In some embodiments, the compressor assembly is hermetically sealed.

In some embodiments, the compressor assembly further comprises a heat exchanger positioned between the variable speed control and the electric motor.

In some embodiments, the heat exchanger positioned between the variable speed control and the electric motor receives the refrigerant returning from the at least one air handler to cool the variable speed control and the electric motor.

In some embodiments, the combination module is mountable on a roof of the vehicle.

In some embodiments, the air conditioning system further comprises a fan mountable over the combination module and arranged to move air and into the combination module.

In some embodiments, the air handler is mountable to the ceiling of the cab.

According to another aspect of the disclosure, there is provided a combination module for mounting in or on a vehicle, and for coupling to an evaporator coil such that refrigerant flows between the combination module and the evaporator coil, the combination module comprising: a condenser coil; and a compressor assembly, the compressor assembly comprising an electric motor.

In some embodiments, the combination module is for mounting inside the vehicle to cover a hole in a floor or outer wall of the vehicle, and the condenser coil, when mounted, being positioned over the hole such that air entering through the hole ventilates the condenser coil.

In some embodiments, the combination module is for mounting over a hole in the floor of the vehicle.

According to one aspect of the disclosure, there is provided a method comprising: mounting a combination module in or on a vehicle, the combination module comprising: a condenser coil; and a compressor assembly, the compressor assembly comprising an electric motor.

In some embodiments, mounting the combination module in or on the vehicle comprises mounting the combination module inside the vehicle to cover a hole in a floor or outer wall of a vehicle, and the condenser coil, when mounted, being positioned over the hole such that air entering through the hole ventilates the condenser coil.

In some embodiments, the hole is in the floor of the vehicle.

In some embodiments, the method further comprises: mounting at least one air handler in the vehicle remote from the combination module, each air handler comprising a respective evaporator coil; and coupling each air handler to the combination module to allow refrigerant to flow between the respective air handler and the combination module.

In some embodiments, mounting the combination module in or on the vehicle comprises mounting the combination module on a roof of the vehicle.

In some embodiments, the method further comprises mounting a fan over the combination module and arranged to move air and into the combination module.

In some embodiments, the method further comprises: mounting at least one air handler to a ceiling of a cab of the vehicle, remote from the combination module, each air handler comprising a respective evaporator coil; and coupling each air handler to the combination module to allow refrigerant to flow between the respective air handler and the combination module.

Other aspects and features of the present disclosure will become apparent, to those ordinarily skilled in the art, upon review of the following description of the specific embodiments.

BRIEF DESCRIPTION OF THE DRAWINGS

Aspects and embodiments of the disclosure will now be described in greater detail with reference to the accompanying diagrams, in which.

DETAILED DESCRIPTION

According to some aspects of the disclosure, an air conditioning system for a vehicle, such as a locomotive, is provided. It is to be understood that the air conditioning system is not limited to use in locomotives, and may also be used in other types of vehicles (for example, trucks, busses, other work vehicles etc). According to some embodiments, the main components of the air conditioning system (e.g. condenser, evaporator and compressor) may be installed inside the vehicle, and the system may be as flexible, or more flexible, than conventional split system air conditioners.

Figure 1:
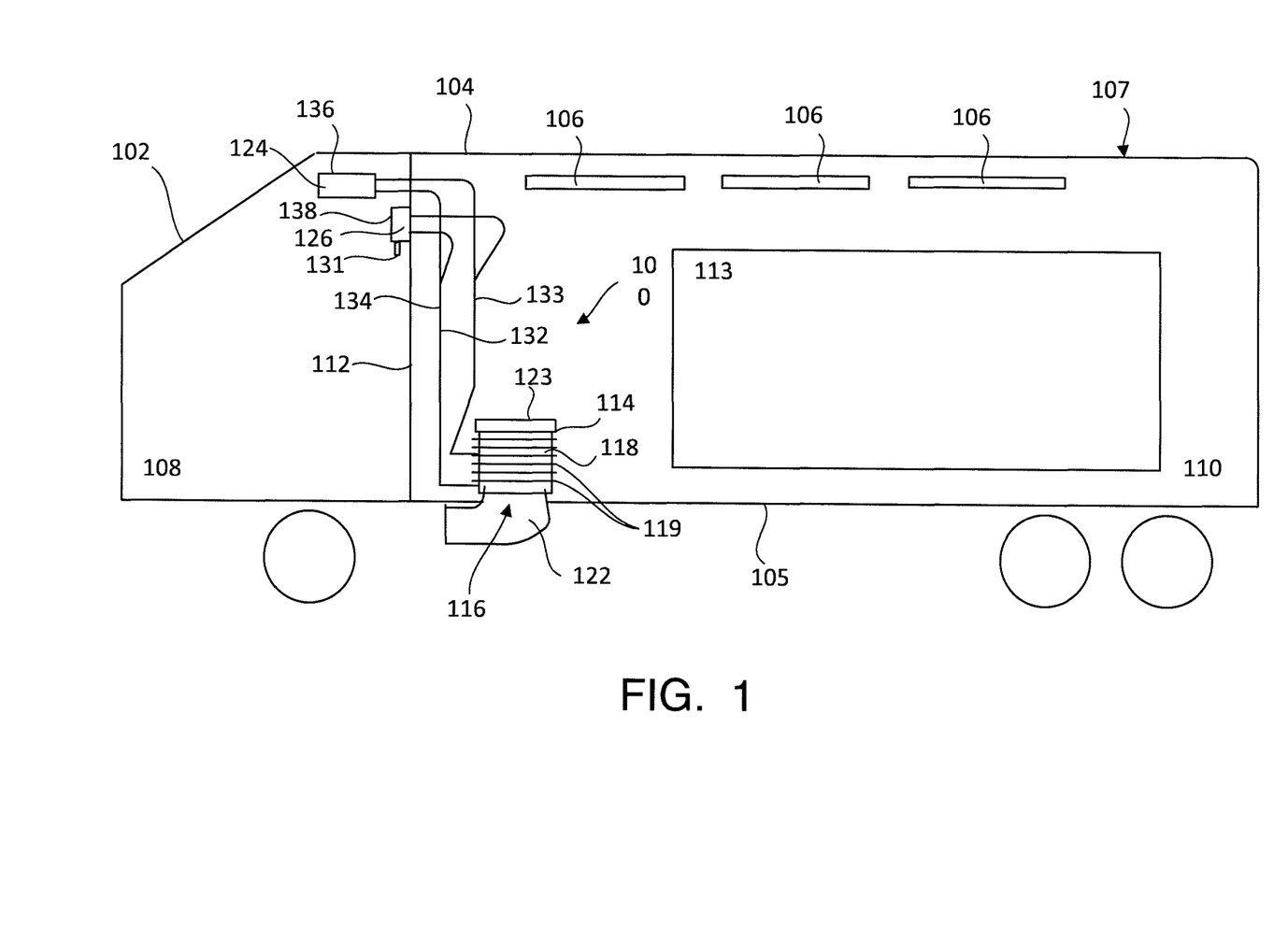
FIG. 1 is a side sectional view of a locomotive including an example air conditioning system according to some embodiments.

FIG. 1 is a side sectional view of a locomotive 102 including an example air conditioning system 100 according to some embodiments. The locomotive 102 may be, for example, a conventional diesel-electric locomotive. As mentioned above, the air conditioning system 100 may instead be installed in a different type of vehicle. The locomotive 102 in this example includes an outer body 104 with multiple ventilation holes 106 near a roof 107 of the body 104. The locomotive also includes a floor 105, an operator's cab 108 and a main engine room 110 that are separated by a bulkhead 112. The main engine room 110 includes an engine 113 in this example.

The air conditioning system 100 in this example embodiment includes a condenser/compressor combination module 114 for mounting in or on a vehicle (the locomotive 102 in this example) and two air handlers 124 and 126. The combination module 114 may be mounted inside the vehicle to cover a hole in a floor or an outer wall of the vehicle. In the embodiment shown in FIG. 1, the combination module 114 is for mounting over a hole 116 in the floor 105 of the locomotive. However, in other embodiments, the combination module 114 may be mounted on an outer wall (either inside or outside the locomotive). In other embodiments, a combination module could be mounted on the outside of the vehicle.

In the embodiment of FIG. 1, the hole 116 and combination module 114 are located in the main engine room 110 in this example. The combination module 114 includes a condenser coil 118 and a compressor assembly 120 (shown in FIGS. 3 and 4). The condenser coil 118 is positioned over the hole 116 such that air entering through the hole ventilates the condenser coil 118. The compressor assembly 120 includes an electric motor 121 (shown in FIGS. 3 and 4). The air conditioning system 100 further includes first and second air handlers 124 and 126 that are mounted in the cab 108 of the locomotive 102 (i.e. remote from combination module 114). In other embodiments, more or fewer air handlers may be used. Each air handler comprises an evaporator coil 128 (shown in FIG. 2). The first and second air handlers 124 and 126 optionally further include and a fan 130 (shown in FIG. 2) to move air over the evaporator coil 128 and into the cab 108 in this example. The air handlers 124 and 126 are coupled to the combination module 114 to allow refrigerant to flow between the evaporator coil 128 and the combination module 114 (e.g. using refrigerant lines such as hoses).

As described above, the combination module 114 is essentially a combination condenser/compressor assembly. For ease of description the term "combination module" is used hereafter.

The condenser coil 118 in this example is a finned condenser coil having a plurality of heat exchange fins 119 that generally form a wall through which air may flow to ventilate the fins. Other embodiments may use different types of condenser coils. In FIG. 1, the condenser coil 118 extends around the hole 116 and forms a hollow region 311 (shown in FIG. 3) over the hole for the air to enter into the hollow region 311.

The condenser coil described herein (such as the example coil 118 shown in FIG. 1) may be in various shapes to fit over the hole. In the example of FIG. 1, the condenser coil 118 is an open ended hollow cylinder or barrel shape. The base of the hollow cylinder or barrel need not by circular. For example, other embodiments may use a condenser coil shaped as an open elliptical cylinder. In other embodiments, the condenser coil may be generally box shaped with one or more open sides, and one of the open sides positioned over the hole. Using a cylinder or box shaped condenser coil (or other similar shapes) may reduce the height and/or width of the combination module needed by a flat condenser coil needed to achieve similar cooling. For example, the space required may be reduced by a factor of 3.14 to 4 as compared to a flat coil of the same height.

The hole 116 may be round and sized complementary to the base of the condenser coil 118. The hole in other embodiments may be square for a box shaped condenser coil, etc. Embodiments are not limited to any particular shape of the condenser unit 114 or the hole 116.

The electric motor 121 (shown in FIGS. 3 and 4) in this example may be a DC motor, such as a brushless DC motor. However, the electric motor is not limited to brushless or DC motors. For example, a brushed DC motor or an AC motor could be used. The motor 121 in this example is connected to and powered by a standard 74 VDC locomotive power system (not shown). The motor may be a 3-phase frequency modulated brushless motor controlled by DC chopped power, where the DC current and or frequency controls the speed of the motor. However, embodiments may utilize different power sources as discussed below. For example, the system in some embodiments may be installed in a truck or other vehicle and may be powered by a 12 to 24 VDC power system of the truck or other vehicle.

In the example of FIG. 1, an air intake unit 122 is mounted below and covering the hole 105 for directing air through the hole 116 (and into the combination module 114) to ventilate the condenser coil 118 when the locomotive 102 is in motion. However, an air intake unit for mounting to the hole is not necessarily included as part of the air conditioning system described herein. In the example of FIG. 1, the air intake unit 122 is a ram scoop. However, other air intake unit configurations may be used.

The condenser unit 114 in FIG. 1 includes a top cover 123 that forces the air from the ram scoop 123 to exit the combination module 114 by passing over the condenser fins 119. A top cover may not be included in some embodiments. For example, depending on the shape of the condenser coil in other embodiments, or depending on other factors, a top cover may not be included to restrict or re-direct air flow.

Each of the two air handlers 124 and 126 includes a respective evaporator coil 128 (shown in FIG. 2 and discussed below) and fan 130 (shown in FIG. 2 and discussed below) to move air over the evaporator coil 128 into the cab 108. Other suitable means for moving air (other than a fan) may be used in other embodiments. The air handlers 124 and 126 are coupled to the combination module 114 to allow refrigerant to flow between the air handlers 124 and 126 and the combination module 114.

In this example, refrigerant lines 132 and 133 carry the refrigerant between the combination module 114 and the air handlers 124 and 126. Electric connections 134, such as wires or cables, carry electricity between the combination module 114 and the air handlers 124 and 126. The electric connections 134 are shown bundled together with refrigerant lines 132 in FIG. 1. The refrigerant lines 132 and 133 and the electric connections 134 pass through the bulkhead 112 between the cab 108 and the main engine room 110.

The air handlers 124 and 126 have respective casings 136 and 138. Controls 131 are provided on the casing 138 of the second air handler 126. The controls 131 may be reached from the operator's position in the cab 108. The controls 131 may include, for example, temperature and/or air-flow controls. The controls may be implemented, for example, with a processor and/or memory (not shown) and control inputs (not shown). The air handlers 124 and 126 may be compact so as not to interfere with head room in the operator's position of the cab 108, while also providing comfort through cooled air. Since the combination module 114 is behind the bulkhead 112 and not in the cab 108, heat given off at the combination module 114 may not enter the cab 108 and is instead ventilated from the engine room 110. Only cool air from the air handlers 124 and 126 may be circulated in the cab, which may avoid the need to cut extra holes in the cab for ventilation.

Figure 2:
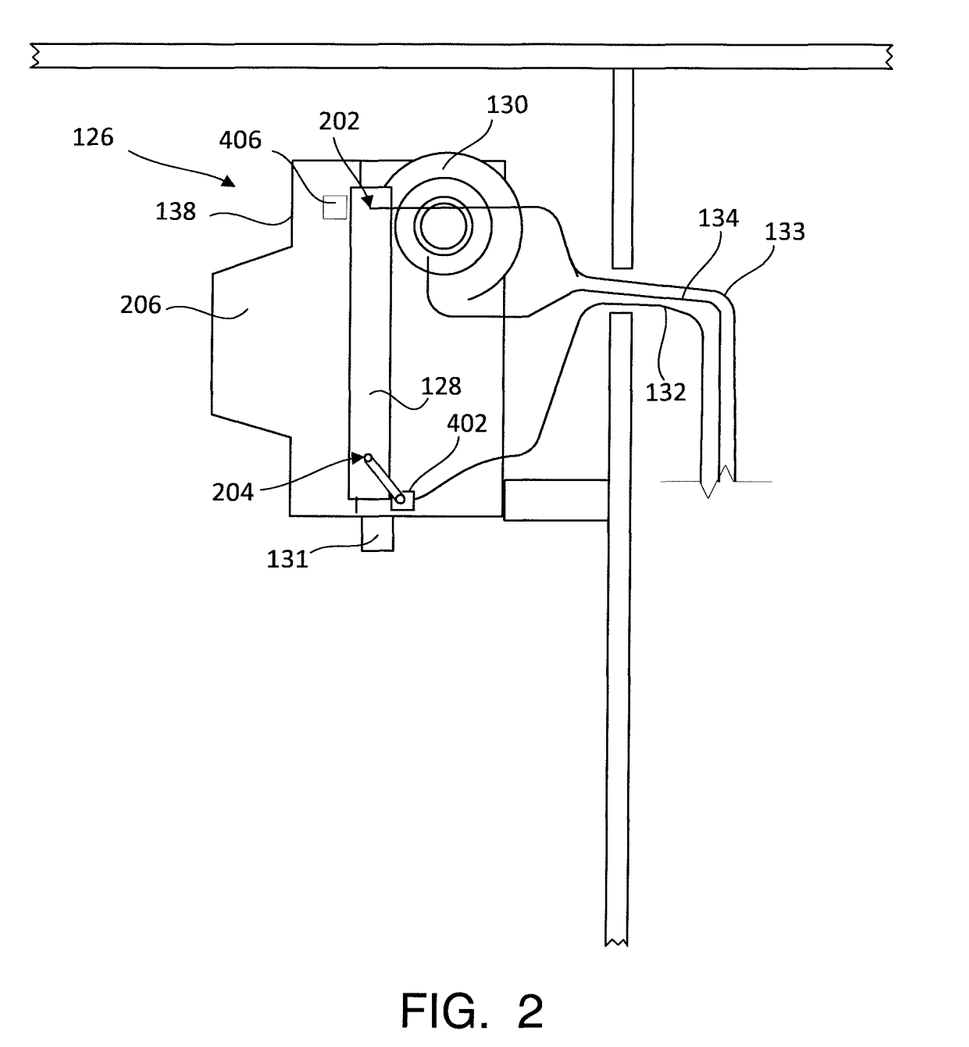
FIG. 2 is a side sectional side view of an air handler according to some embodiments.
Figure 3:
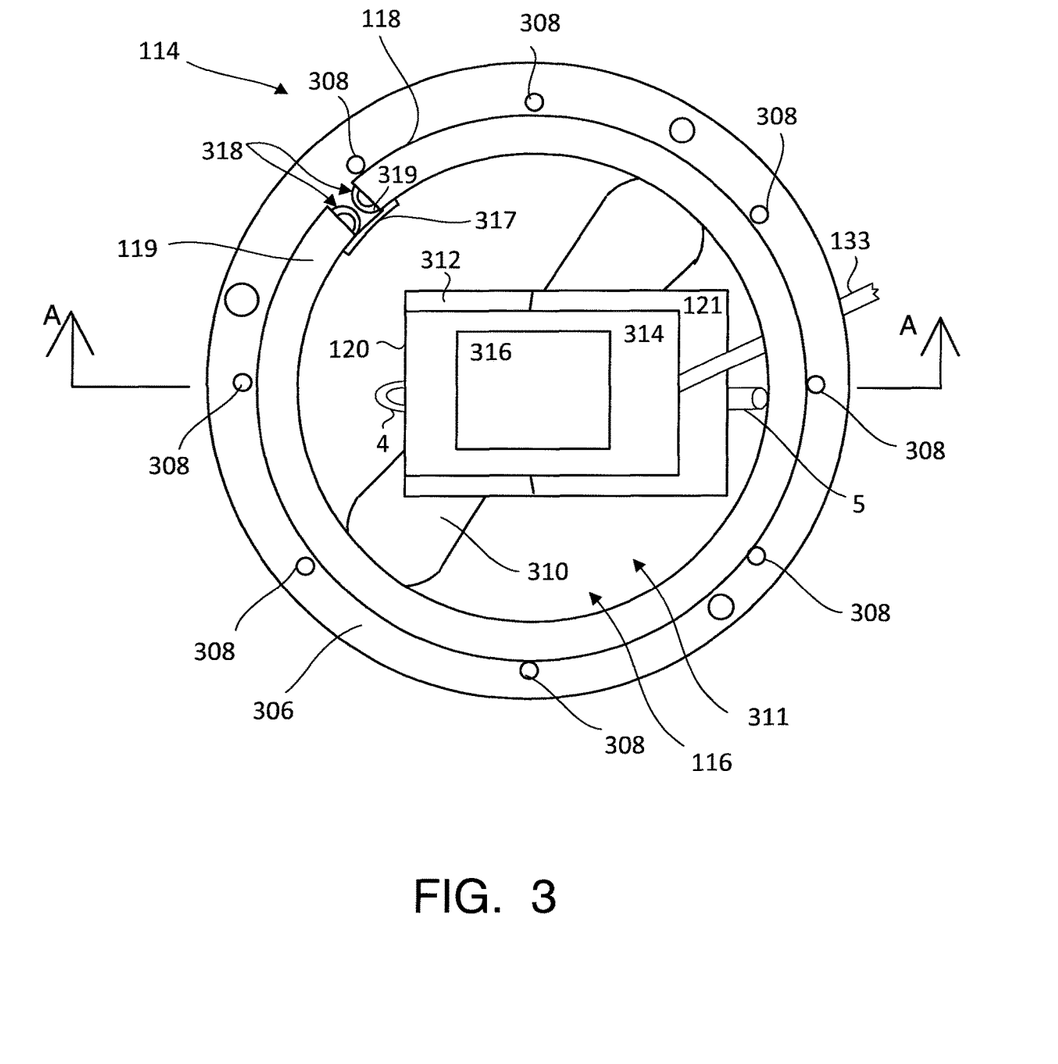
FIG. 3 is a top view of a combination module according to some embodiments.
Figure 4:
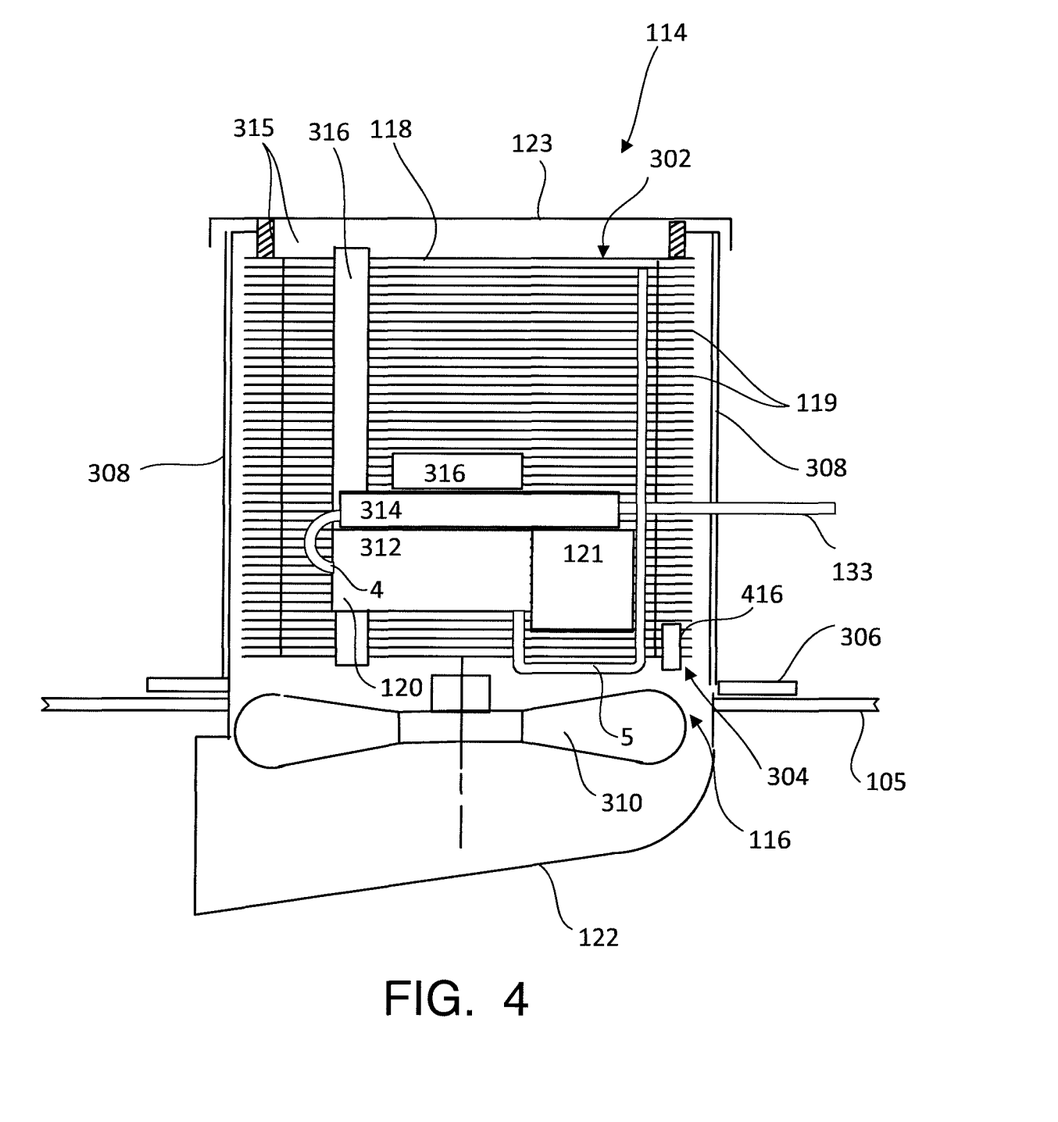
FIG. 4 is a sectional side view of the combination module taken along the line A-A in FIG. 3.

In operation, refrigerant (not shown) is circulated through the system 100 by the compressor assembly 120 (shown in FIGS. 3 and 4). A person skilled in the art will appreciate that when refrigerant is cycled through the evaporator coils 128, the compressor assembly 120, and the condenser coil 118, cooling is generated at the evaporator coils 128, and heat is generated at the condenser coil 118 through a heat exchange process. Thus, cool air is provided by the air handlers 124 and 126 in the cab 108 of the locomotive 102, while excess heat is transported by the refrigerant to the combination module 114 and then vented by air flow through the combination module 114, and the heat is eventually ventilated out of the main engine room 110 through the ventilation holes 106 by the air circulation in the main engine room 110. The combination module 114 and the air handlers 124 and 126 will be discussed in more detail below with reference to FIGS. 2 to 4. As will also be discussed in more detail below, the system 100 shown in FIG. 1 uses Variable Speed Control (VSC) to control the flow rate of the refrigerant is controlled to control the cool air output of the air handlers 124 and 126, rather than cycling the compressor assembly 120 between on and off states. In other embodiments, Variable Flow Control (VFC) may be used as a variable control rather than VSC. VFC and VSC systems may reduce the amount of power needed to start the motor ("transient power"), whereas a higher transient power may be needed to start a motor that is must go from stopped to full power when cycled on/off.

A VSC system may use variable motor speed to adjust refrigerant flow (e.g. by varying the current and/or chopping frequency of the voltage in the motor). For VFC, variable displacement rate of the compressor (with a constant motor speed) may be used. For example, in a swash plate compressor, the angle of the plate may be varied so that more refrigerant is displaced over the same time without changing motor speed. For VFC, the motor speed would be adjusted with the swash plate angle remaining constant. Some combination of VFC and VSC could also be used. This variable system may lower noise levels, reduce power consumption, and reduce vibrations, load and wear. For example, a VSC or VFC system may softly ramp up when first engaged, and thereafter run continuously matching refrigerant flow and heat-load to equilibrium for a desired temperature setting. Embodiments are not limited to those using VFC or VSC and the variable control may be omitted.

As mentioned above, the example air conditioning system 100 is connected to the 74 VDC power system of the locomotive 102. In other embodiments, other power sources (such as batteries) may be used. For example, the air conditioning system may be powered by a 12-24 VDC power source, for example in a truck. A vehicle's own battery charging generator on its main engine may also provide sufficient power. This arrangement may allow use for longer periods with the main engine is stopped to avoid idling. For long stops and to reduce heavy emissions the air conditioning system may be powered by a common 74 VDC Auxiliary Power Unit (APU) of sufficient capacity such as the BANANA™ Diesel APU.

The air conditioning system 100 has no inverter, which may save space and reduce the total weight of the system 100 compared to conventional retro-fitted air conditioning systems. Efficiency (kW consumption to BTU of cooling) may also be improved, and cost over the lifetime of the air conditioner may be drastically reduced compared to conventional solutions. The air conditioning system 100 described above may not require a new hole cut in the roof of the locomotive, or the accompanying structural reinforcement and gasketing required for conventional roof-top systems.

Since the air conditioning system 100 is a split system, the components (air handlers 124 and 126, and the combination module 114) can be placed in various positions inside a vehicle. The positioning of these components is not limited to the example positioning shown in FIG. 1. For installation, the components of the air conditioning may be easy to carry onboard a vehicle.

In the example of FIG. 1, since the air handlers 124 and 126 are the only components of the air conditioning system 100 in the cab 108, the system 100 may be quieter (in the cab 108) than conventional roof-top systems, while also having less impact on head-room. The two air-handlers 124 and 126 may be arranged one on each side of the driver, and may also be high up near where the bulkhead 112 meets the roof of the cab 108. Such an arrangement may provide superior control and comfort, while not significantly impeding head room. Other arrangements of the system 100 are also possible. For example, more or fewer air handlers may be used. Air handlers may be put in different positions than described above in the cab.

As shown in FIG. 1, all components of the air conditioning system 100 (with exception of the ram scoop 122) are inside the locomotive and may, thus, be protected from outside weather.

FIG. 2 is a side sectional side view of the second air handler 126 shown in FIG. 1. The second air handler 126 includes the casing 138, and the evaporator coil 128 mounted within the casing 138. The evaporator coil 128 may, for example, be a finned evaporator coil with multiple heat exchange fins (not shown). The evaporator coil 128 has a refrigerant output 202 and a refrigerant input 204. The refrigerant lines 132 is coupled to the input 204 (via expansion valve 402) and the refrigerant line 133 is coupled to the output 202 for circulation of refrigerant through the evaporator coil 128. The refrigerant line 133 connected to the output 202 carries cool refrigerant gas from the evaporator coil 128 to the compressor assembly 120. The refrigerant line 132 connected to the input 204 carries refrigerant liquid from the condenser coil 118 to the evaporator coil 128. A person skilled in the art will appreciate that the expansion valve 402 may not be included in the air handler in some embodiments. For example, an expansion valve may be placed outside of the air handler.

The refrigerant lines 132 and 133 may be, for example, rubber tubing or other suitable tubing or pipes. The refrigerant may be Freon™, and the refrigerant lines 132 may be Freon hoses. Other possible refrigerants include, but are not limited to propane, ammonia, and $CO_2$. The casing 138 of the air handler 126 also includes at least one air nozzle or vent 206. The fan 130 is mounted in the air handler 126 and is arranged to blow air over the evaporator coil 128 and through the at least one air nozzle or vent 206 into the cab 108. FIG. 2 also shows the controls 131 discussed above. Embodiments are not limited to any particular structure or arrangement of the casing 138, the evaporator coil 128, or the fan 130.

The air handler 126 in this example also includes an optional sensor 406 that takes air temperature measurements for the variable control of the refrigerant flow. The sensor may be located near the evaporator coil 128. Optionally, a sensor (not shown) may be included within the refrigerant lines (e.g. tubes) or within the evaporator coil 128 to measure the temperature and/or pressure of the refrigerant. VSC/VFC is described in more detail below. Embodiments are not limited to VSC/VFC implementations, and the temperature sensor 406 in the air handler 126 is not required in all embodiments.

The first air handler 124 is similar to the second air handler 126 and is not described in further detail herein, but the first air handler 124 in this embodiment does not include the controls 131 or the temperature sensor 406. In other embodiments, multiple controls may be used on multiple air handlers.

The combination module 114 will now be described in more detail with reference to FIGS. 3 and 4. FIG. 3 is a top view of the combination module 114, but with the lid 123 (shown in FIG. 4) removed. FIG. 4 is a side sectional view of the combination module 114 taken along the line A-A in FIG. 3. Refrigerant lines 133, 4 and 5 shown in FIG. 3 (and FIG. 5) are not shown in FIG. 4.

The combination module 114 includes the condenser coil 118, with the fins 119, as described above. The condenser coil in this example includes a serpentine tube 319 (shown in FIG. 3), that carries the refrigerant through the fins 119 for heat exchange in the condenser coil 118. The serpentine tube 319 (shown in FIG. 3) is removed in FIG. 4 so that the remainder of the condenser coil 118 is more clearly visible. Similarly, the refrigerant line 132 (shown in FIGS. 2 and 5) that carries refrigerant from the serpentine tube output to the air handlers 124 and 126 is not shown in FIG. 3 or 4. However, a person skilled in the art is familiar with serpentine tubes in condenser coils.

As shown in FIG. 4, the combination module 114 has a top end 302 and a bottom end 304. The combination module 114 is bolted to the vehicle floor 105 by means of a flange 306 at the bottom end 304 of the combination module 114. Other means of attaching or mounting the combination module to the floor may also be used (e.g. welding, rivets, clamps, etc.). In this example, the combination module 114 also includes a wire frame 308 of circular shape surrounds the circular cylinder or barrel shaped condenser coil 118. The wire frame may provide protection for the condenser coil. Other frames or casings may be used in other embodiments. For example, a ventilated cylindrical or box shaped metal case could be used. In other embodiments, no frame or casing may be present around some or all of the condenser coil.

The compressor assembly 120 is mounted in the hollow region 311 (shown in FIG. 3) within the condenser coil 128. The compressor assembly 120 may be mounted using any suitable method, such as a frame, fasteners such as bolts, screws etc., welding and/or brackets to name a few examples. The compressor assembly 120 includes the electric motor 121, a compressor 312 coupled to the electric motor 121, a heat exchanger 314, and a VSC control box 316. The electric motor may also be a brushless DC motor, or another type of electric motor. The compressor 312 may, for example, be a swash-plate multi-cylinder compressor. The compressor 312 may also be a suitable type such as a Scroll compressor or a Vane compressor.

The heat exchanger 314 is sandwiched between the electric motor 121 and the VSC control box 316. The heat exchanger in this example is an elongated and hollow box shape (i.e. cuboid or rectangular prism) made of metal such as aluminum. Cold low pressure refrigerant is transported to the heat exchanger via refrigerant line 133 and then travels through the hollow area of the heat exchanger 314. Other types of heat exchangers (such as a tube or channel with fins) may also be used. Embodiments are not limited to a particular heat exchanger type, and the heat exchanger 314 may be omitted in other embodiments.

The cold low pressure refrigerant then leaves the heat exchanger 314 and is transported to the compressor 312 via line 4. The compressed refrigerant leaves the compressor 312 and is then transported to the condenser coil via refrigerant line 5. The refrigerant lines 133, 4 and 5 shown in FIGS. 3 and 4 are examples only, and the actual shape, size, placement and physical arrangement of these lines may vary. For example, the line 133 could exit the combination module at the top end 302 or bottom end 304 of the combination module. Other modifications may also be made.

The VSC box 316 controls the flow rate of the refrigerant in the system 100. In other embodiments, a VSC may be omitted and/or a VFC may be used. The VSC box 316 receives temperature measurements from the sensor 406

(shown in FIG. 2) in the second air handler 126. The VSC box 316 responds by adjusting the flow of refrigerant as needed. For example, if the temperature measured by the sensor is above threshold then the VSC box may increase the refrigerant flow. The threshold may be based on a temperature set by the controls 131 shown in FIG. 2. Conversely, if the measured temperature is close to or below the temperature set by the controls 131, then the VSC box 316 may reduce refrigerant flow accordingly. The VSC box 316 may control the refrigerant flow by adjusting the current, frequency, and/or voltage provided to the electric motor 121. Variable flow control systems may have less wear and tear and be more power efficient than on/off cycling systems. The VSC box 316 may include a processor and/or memory (not shown) programmed to perform the controlling functions described above. As will be explained below, the VSC box 316 in this example is cooled by the refrigerant via the heat exchanger 314. No extra fan is used to cool the VSC in this embodiment, but other embodiments may be arranged differently (e.g. to include a fan for cooling the VSC box 316 and/or omitting the heat exchanger 314).

The compressor assembly 120 is coupled to receive refrigerant returned from the evaporator coil 128 (shown in FIG. 2) via refrigerant line 133. The compressor assembly 120 is coupled to the condenser coil 118 to provide compressed refrigerant to the condenser coil 118, as described in more detail below with respect to FIG. 5.

The compressor assembly 120 may include a direct drive 1:1 reduction without belts or tensioners. That type of compressor assembly 120 may reduce the frequency of servicing needed compared to motors/transmissions utilizing belts and tensioners. The compressor assembly 120 may be hermetically sealed with no moving/wearing parts penetrating an outer casing of the compressor assembly 120. This may prevent or reduce the likelihood of oil or refrigerant leaking from the compressor assembly 120 to its external environment. As noted above, the electric motor 121 in this example may be a brushless motor. The motor may be sufficiently cooled by returning cold refrigerant such that no additional cooling fan is needed for the electric motor 121. In some embodiments, the electric motor 121 and the compressor 312 share a common drive shaft (not shown). For example, the motor 121 and the compressor 312 may be aligned such that a single drive shaft extends between the motor 121 and the compressor 312, although embodiments are not limited to this arrangement. The motor 121 and the compressor 312 may, together, be hermetically sealed.

In this embodiment, the combination module 114 further includes an assisting fan 310 that is mounted to the wire frame 308 proximate to the hole 116 to selectively provide additional air flow, as needed. For example, the assisting fan 310 may be turned on when the locomotive is stopped or below a threshold speed and air is, therefore, not being moved into the condenser unit 114 sufficiently by the ram scoop 122. The assisting fan 310 may be turned on or off as a function of measurements from a temperature sensor 416 (shown in FIGS. 4 and 5) on a liquid refrigerant line of the condenser coil 118. For example, the combination module 114 may include a fan control (not shown) that turns the assisting fan 310 on if the temperature of the refrigerant (e.g. Freon) exceeds a threshold. Similarly, the assisting fan 310 may be turned off if the measured temperature is below a threshold. The assisting fan 310 may, thus, be used to keep the condensed refrigerant at a pre-set temperature. When air flow from the ram scoop 122 is sufficient to cool the condenser coil 118, the fan may stop so to save electric power. In some embodiments, the pressure measurements of the refrigerant rather than, or in addition to, the temperature measurements may be used to control the assisting fan 310. The assisting fan 310 may also be selectively activated as a function of the speed of the locomotive.

A foam rubber seal 315 (shown in FIG. 4) may be provided around the top of the condenser coil 118 such that, when the top cover 123 is on, air is substantially or completely prevented air from flowing out of the top end 302 of the combination module 114. Thus, the air may be directed over/between the fins 119 of the condenser coil 118. The rubber seal 314 may be part of the top cover 123 in some embodiments or may be omitted or replaced with another seal type.

A rubber foam strip 317 may be provided as shown in FIGS. 3 and 4 to prevent air leakage around hair pin ends of the serpentine tube 318 (shown in FIG. 3) in the coil 118.

Optionally, cooling of the electric motor 121 and the VSC box 316 may be performed by returning cold low pressure refrigerant from the air handlers 124 and 126. In the example of FIGS. 3 and 4, the refrigerant from the air handlers 124 and 126 is routed to the compressor assembly 120. At the compressor assembly, the cold refrigerant first travels through the heat exchanger 314 sandwiched between the VSC box 316 and the electric motor 121, such that heat from the VSC box 316 and the electric motor 121 is drawn into the refrigerant. The refrigerant is transported from the heat exchanger 314 to the compressor 312. The compressor assembly 120 does not include a cooling fan in this example embodiment, although other embodiments may include one or more fans.

The combination of the condenser coil 128 and the wire casing 308 provides protection for the inner components of the combination module 114 (e.g. the compressor assembly 120 and the assisting fan 310).

The combination module 114 may be affixed to the floor 105 using bolts (not shown) in the flange 306. For example, only three bolts may be used, although embodiments are not so limited. The combination module 114 shown in this embodiment may be compact compared to conventional condensers and compressors used in locomotives, and it may fit easily in, for example, a standard diesel electric locomotive type GE or EMD.

Figure 5:
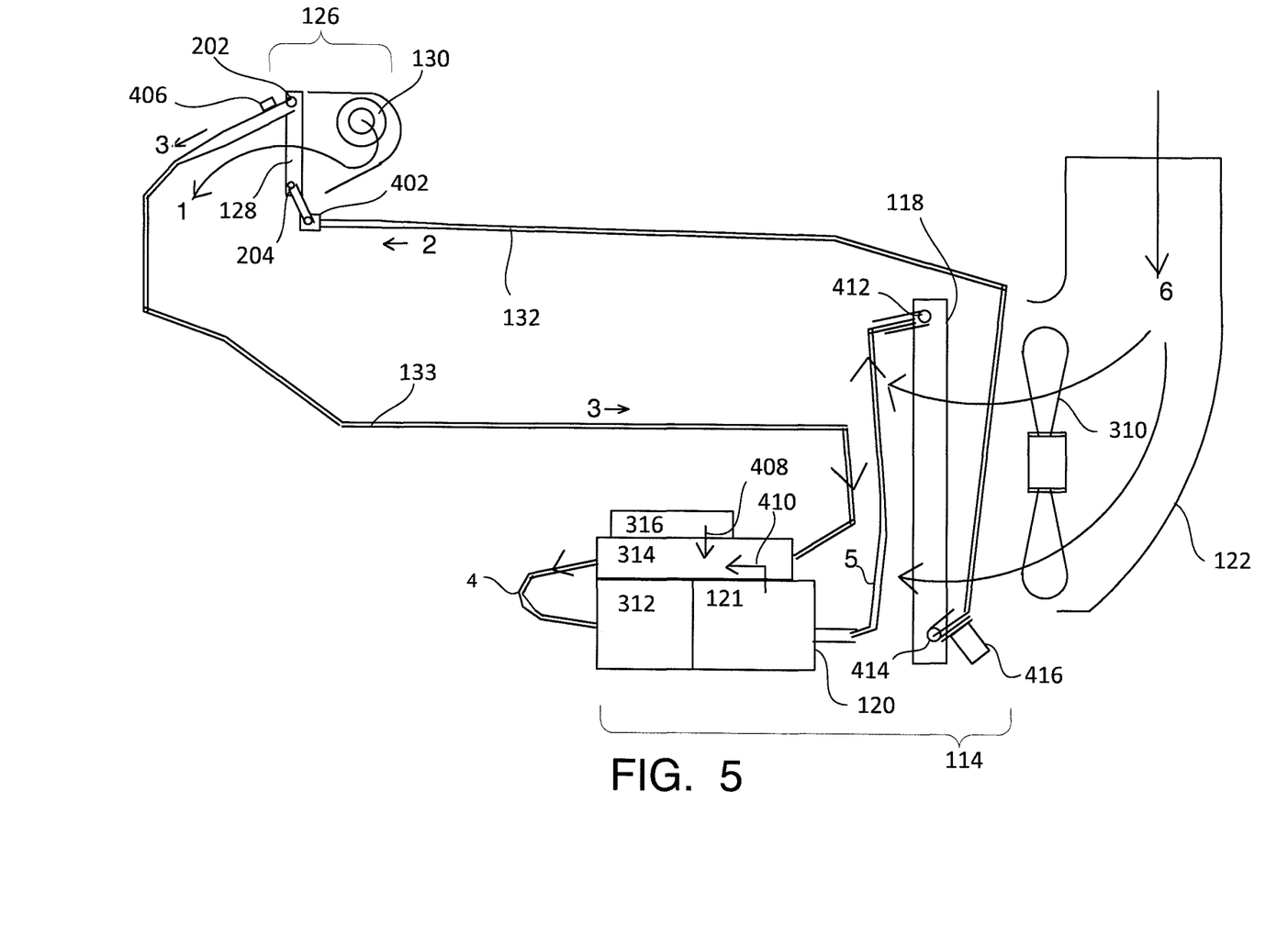
FIG. 5 is a diagram illustrating the path of refrigerant flow and heat flow through the air conditioning system of FIG. 1.

FIG. 5 is a diagram illustrating the path of refrigerant flow and heat flow through the air conditioning system 100 described above with reference to FIGS. 1 to 4.

In FIG. 5, arrow 1 shows the flow of air through the second air handler 126 by the fan 130 and over the evaporator 128 and cold air out to the cab 108 (shown in FIG. 1). Arrow 2 shows the flow of warm pressurised refrigerant liquid into the expansion valve 402 and serpentine tubes (not shown) in the evaporator coil 128 at input 204.

Arrows 3 show the flow of cool low pressure refrigerant gas that is sucked down through refrigerant line 133 from the evaporator 128 to cool the heat exchanger 314 in the compressor assembly 120. A temperature/pressure sensor 406 is shown on the refrigerant line 133 and feeds measurement signals to the VSC box 316 to adjust the refrigerant flow.

Although the first air handler 124 is not shown in FIG. 5, it is similarly coupled to the combination module to receive warm liquid refrigerant and output cool refrigerant gas. Specifically, the first and second air handlers 124 and 126 may be couple to the combination module 114 in a cascade mode, where each refrigerant line 132 and 133 spits to couple to each air handler 124 and 126, as shown in FIG. 1.

Arrows 408 and 410 show heat flow from the VSC box 316 and the electric motor 121 respectively into the heat exchanger 314.

A refrigerant line 4 carries the refrigerant output from the heat exchanger 314 to be input to the compressor 312.

A refrigerant line 5 carries high pressure hot refrigerant gas output from the compressor assembly 120 to be input to the condenser coil 118. FIG. 5 shows condenser coil input 412 and condenser coil output 414. The refrigerant enters the condenser coil 118 at the condenser coil input 412 from the refrigerant line 5. The refrigerant lines 4 and 5 may be any suitable tubing or hosing, for example.

In this embodiment, in the condensers module 114 near the condenser coil output 414 is temperature and/or pressure sensor 416 monitoring the condition in the liquid refrigerant and the performance of the condenser coil 118. Measurements from the sensor 416 may be used to turn on the assisting fan 310 as needed, for example if the air flow from the ram scoop (shown in FIG. 1) is too slow to sufficiently cool the condenser coil 118. In other embodiments, the sensor 416 and/or assisting fan 310 may be omitted.

The warm liquid refrigerant exits condenser coil 118 from the condenser coil output 414 via refrigerant line 132 and travels back to the first air handlers 124 (shown in FIG. 1) and the second air handler 126, as discussed above, thus completing the refrigerant cycle.

Arrows 6 shows the flow of air through the ram scoop 122 and over the condenser coil 128

As noted above, in some embodiments, the electric motor for the compressor assembly may be a BLDG (brushless) 3-phase frequency modulated motor driven by the locomotives 74 VDC system (as with the combination module 114 shown in FIGS. 1, 3 to 5). The brushless DC motor may be electronically commutated by means of a sensor (e.g. a Hall effect sensor) monitoring the angle of rotor magnets and the rotational speed. The sensor may feed the information to a Variable Speed Controller (VSC) (such as the VSC box 316 shown in FIGS. 4 and 5). As also described above, an air temperature sensor (such as the sensor 406 shown in FIG. 2) in the cold air leaving the air-handler may feed information to the VCS as described above. Using this information, the VCS may slowly ramp up the motor speed with a soft start, increasing the refrigerant flow if a high cooling rate is needed, to bring the temperature down in the vehicle (e.g. in the cab of the vehicle). As the air temperature drops the VCS may reduce the motor speed (thereby reducing the power consumption and refrigerant flow) until refrigeration capacity and cab demand comes to an approximate equilibrium. The motor may then run at a lower speed as long as the air temperature stays at set point. The VSC may, for example, be fed from batteries, such as 65 V batteries of the locomotive. Alternatively, if the main engine of the locomotive runs from an auxiliary generator, the motor may be powered by another power source coupled to the main engine.

The power draw of a VSC system described above may be up to 70 percent more efficient than a conventional inverter system, which produces 220 VAC from 74 VDC, and a cycling compressor for the same cooling output. The smooth calibration of the compressor flow (compared with the constant stop/start of a conventional cycling system) may produce less noise and vibrations and less wear on the motor and compressor, and no cycling relays.

In some embodiments, the air conditioning system (such as the system shown in FIGS. 1 to 5) optionally includes a reverse valve (not shown) in the refrigerant loop which reverses the cycle of the refrigerant and thereby reverses the cooling/heating cycle. Heat, rather than cooling may thereby be provided to the cab of a vehicle. Specifically, heat from the airflow entering the combination module could be used to heat refrigerant (i.e. the combination module may then function as the evaporator/cooler part of the cycle) and the heated refrigerant may transfer heat to the air handlers (i.e. the evaporator coil in the air handler may then act as the condenser/heater part of the cycle). Optionally, any temperature and/or pressure sensors in the system could be re-purposed in the reversed cycle. For example, signals from the sensor at an air handler (used to measure cooling in the normal cycle) and at the combination module (used to monitor heat in the normal cycle) could be reversed to make a VSC control and an assisting fan at the combination module match the reversed cycle mode of operation. Optionally, the temperature thresholds used to control the VSC box and the assisting fan could be altered (possibly without reversing the sensor signalling). Alternatively, one or more additional sensors (not shown) could be used for operation in the reversed mode, rather than the sensors 406 and 416 shown in FIGS. 2, 4 and 5.

Example dimensions and arrangements of a condenser coil (for example, the condenser coil 118 shown in FIGS. 1 and 3 to 5) are provided below. However, embodiments are not limited to the example dimensions described herein, and the condenser coil may take various shapes and be sized for being mounted above a hole in a floor of a vehicle. A combination module according to some embodiments may be about ⅙ of the weight and/or ⅓ of the volume of a conventional roof-top locomotive air conditioning system of comparable cooling capacity.

For a condenser coil with heat exchange fins, condenser performance is generally dependent on surface area of the fins and cooling air velocity. For example, a conventional flat rectangular, finned condenser coil with two 12" fans moving air through the fins will provide a given amount of heat transfer and condensing power. However, if that condenser has fins and/or more air velocity, the condenser power (and the refrigeration efficiency) may increase. For example, overall refrigerant pressure may decrease, which may then require less power.

A flat rectangular finned condenser coil that is 28" wide by 19" High and 2" thick has a volume of 1064 cubic inches. A condenser coil in an open ended, hollow cylinder or barrel shape having the same 2" thickness would provide approximately the same volume with a diameter of approximately 14" and a height of 12". Thus, the cylinder shaped condenser coil would be shorter and less wide than the flat rectangular condenser coil having a similar volume. Similarly, a box shaped condenser coil (e.g. with four side walls, and an open top and bottom), may also be shorter and less wide than a comparable flat rectangular condenser coil. This reduction in dimensions may make the combination module containing the condenser coil more compact and easier to fit in a vehicle such as a locomotive.

Figure 6:
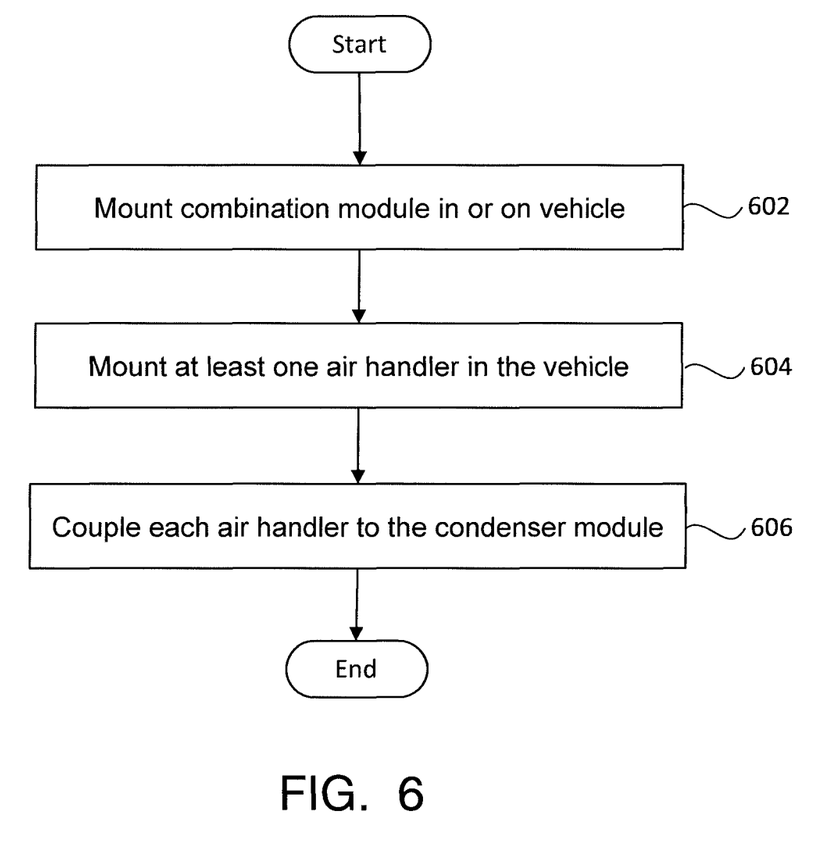
FIG. 6 is a block diagram of a method according to some embodiments.

FIG. 6 is a block diagram of a method according to some embodiments. At block 602, a combination module is mounted in or on a vehicle. For example, the combination module may be mounted above a hole in the floor (or elsewhere) in the vehicle as described above. The combination module could also be mounted outside of the vehicle in some embodiments. The combination module may be as described above or below (e.g. the combination module 114 shown in FIGS. 1 and 3 to 5). Optionally, at block 604, at least one air handler is mounted in the vehicle remote from the combination module. The at least one air handler may be as described above or below (e.g. the air handlers 124 and 126 shown in FIGS. 1, 2 and 5). Optionally, at block 606, each air handler is coupled to the combination module to allow refrigerant to flow between the respective air handler and the combination module.

In some embodiments, quick connectors may be used for the process of coupling the combination module to the one or more air handlers. The use of quick connectors for coupling/uncoupling the various components of the system may allow for easier installation of the system in various configurations and in various types of vehicles.

For installation on the floor of the vehicle, a rectangular or other shaped (e.g. circular) hole about as long and wide as the combination module may be cut in the floor of the vehicle, and the combination module may then be mounted over the hole.

According to some embodiments, the air conditioning system described herein (such as system 100 shown in FIGS. 1 to 5) may have fewer moving parts than conventional roof-top or split systems. This may reduce wear and maintenance. As also described above, the system may be installed inside the vehicle, which may reduce dust, water and/or other elements from entering the system from the outdoors resulting in a cleaner system.

In embodiments using rubber hosing for the refrigerant line, the system described herein may require approximately 50% less rubber hose parts and/or reduce rubber hose length by 50% compared to conventional split-system air conditioners. Reducing the length of the hose used may reduce leakage from the hose.

Although not required in all embodiments, the open ended, hollow cylinder shaped or box shaped condenser coil described above may reduce the overall length and height of space required for the coil. With the compressor assembly attached/packaged with the condenser coil, the condenser coil can have a minimum height that matches the height of the compressor assembly without the compressor module extending above or below the condenser coil. For example, if the compressor assembly is 12 inches high, the condenser coil may be 12 inches high, or more, so that the compressor assembly can be hidden behind the condenser coil. However, reducing the height of the condenser coil will increase the length or width of the coil needed to achieve the same cooling. A flat rectangular condenser coil may need to be so long (especially with a reduced height) that it is difficult to find space to install it in the vehicle, let alone move it into the vehicle for installation without damage.

By making the coil into a 4-walled box shape, the length (in one dimension) of the condenser coil having the same height and thickness will be reduced by a factor of four, while a cylindrical shape would reduce the length by a factor of approximately 3.14. As an example of how compact a square shaped condenser may be, a flat rectangular coil that is 28 inches long by 19 inches high and 2 inches thick has a volume of 1064 cubic inches. By contrast, a 4-walled box shape would have the same volume with each wall being approximately 11 inches long by 12 inches high by 2 inches wide. By using a circular cylinder shape, the length (in one dimension) will also be reduced compared to the flat rectangular model.

Figure 7:
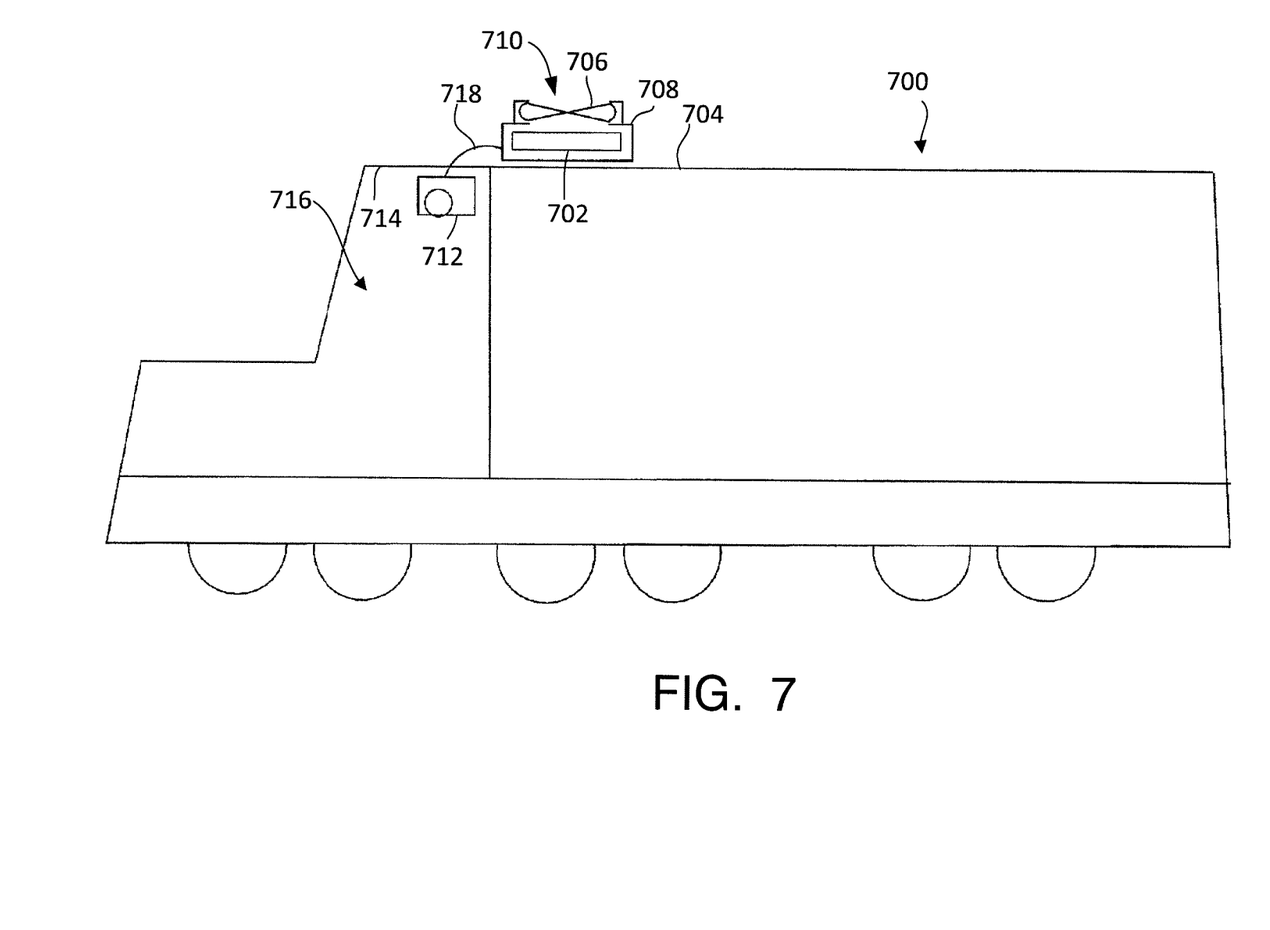
FIG. 7 is a side schematic view of a locomotive in which a combination modle is mounted on the roof of the locomotive.

In some embodiments, the combination module is mounted to the roof of a vehicle (e.g. locomotive). FIG. 7 is a side schematic view of a locomotive 700 in which a combination module is mounted on a roof 704 of the locomotive 700. An optional fan 706 is mounted over the combination module 702 to move air into the combination module 702. In other embodiments, motion of the locomotive may push sufficient air through the combination module for cooling purposes.

An optional weather hood 708 is installed that partially covers the fan 706 and combination module 702. The weather hood 708 in this example defines an upper hole 710 to allow air to be blown into the combination module 702. Slots (not shown) or other openings may be provided in sides of the weather hood to allow air to exit. Various other configurations are also possible.

An air handler 712 is mounted to the ceiling 714 of the cab 716 of the locomotive 700. The air handler 712 is coupled to the combination module 702 by refrigerant hoses or tubes 718. The combination module 702 is similar to the condenser/compressor combination module 114 of FIG. 1, but mounted on the roof 704 (rather than over a hole in the floor). The air handler 712 is similar to the air handlers air handlers 124 and 126 of FIG. 1.

The roof-installation arrangement of FIG. 7 (or other similar roof-mounted arrangements) may be preferred, for example, if sufficient space is lacking within the locomotive or for other reasons. In comparison to the floor mounted version, the fan 706 shown in FIG. 7 blows air downward, rather than upward. This arrangement may require only small holes in the ceiling/roof of the locomotive for the refrigerant hoses or tubes 718 (and possibly for power cabling to power the combination module 702 (compressor) and air handler 712 (fans). By contrast, conventional roof top mounted air conditioning systems, may require a large 10 to 15 inch diameter hole for the conventional condenser package combined with the evaporator. The system of FIG. 7 could be referred to as a split system roof mounted air conditioner.

What has been described is merely illustrative of the application of the principles of the disclosure. It is to be understood that a combination of more than one of the above approaches may be implemented in some embodiments. Embodiments are not limited to any particular one or more of the approaches, methods or apparatuses disclosed herein. One skilled in the art will appreciate that variations, alterations of the embodiments described herein may be made in various implementations without departing from the scope thereof. It is therefore to be understood that within the scope of the appended claims, the disclosure may be practiced otherwise than as specifically described herein.

What is claimed is:

1. An air conditioning system for a vehicle comprising:
a combination module for mounting in or on the vehicle, the combination module comprising: a condenser coil and a compressor assembly, the compressor assembly comprising an electric motor, the combination module mounted inside the vehicle to cover a hole in a floor or outer wall of the vehicle, the condenser coil, when mounted, being positioned over the hole such that air enters through the hole and ventilates the condenser coil, the compressor assembly further comprising a flow controller to control flow of refrigerant, the flow controller of the compressor assembly coupled to the electric motor and comprising one of a variable speed control and a variable flow control, the compressor assembly further comprising a heat exchanger positioned between the flow controller and the electric motor, the heat exchanger receiving the refrigerant returning from at least one air handler to cool the flow controller and the electric motor;
the at least one air handler for mounting in a cab of the vehicle, remote from the combination module, comprising a respective evaporator coil, each air handler being coupled to the combination module such that refrigerant flows between the air handler and the combination module;
a fan mounted proximate to the hole to move air into the combination module;
a sensor for taking at least one of temperature measurements and pressure measurements of the refrigerant near the condenser coil; and
a fan controller to selectively activate the fan when it is determined that air flow in the combination module is insufficient as a function of at least one of: the temperature measurements, the pressure measurements and a speed of the vehicle.

2. The air conditioning system of claim 1, wherein the combination module is for mounting over the hole in the floor of the vehicle.

3. The air conditioning system of claim 1, wherein each air handler further comprises a respective fan to move air over the evaporator coil and into the cab.

4. The air conditioning system of claim 1, wherein the condenser coil extends around the hole and forms a hollow region over the hole for the air to enter into the hollow region.

5. The air conditioning system of claim 4, wherein the condenser coil is in the shape of an open ended hollow cylinder, wherein a base of the cylinder is positioned over the hole.

6. The air conditioning system of claim 4, wherein the condenser coil is in the shape of a box with at least one open side, wherein one of the at least one open side of the box is positioned over the hole.

7. The air conditioning system of claim 1, further comprising an air intake for mounting outside the vehicle and covering the hole for directing air through the hole and into the combination module.

8. The air conditioning system of claim 1, further comprising a sensor for taking air temperature measurements at one of the at least one air handler, flow controller controlling the flow of the refrigerant as a function of the air temperature measurements.

9. The air conditioning system of claim 1, wherein at least one of the temperature measurements and the pressure measurements comprise temperature measurements, and selectively activating the fan comprises activating the fan if a measured temperature of the refrigerant exceeds a temperature threshold.

10. The air conditioning system of claim 1, wherein the electric motor comprises a DC motor.

11. The air conditioning system of claim 1, further comprising a reverse valve that reverses flow of the refrigerant such that the condenser coil functions as an evaporator and the evaporator coil functions as a condenser, to thereby provide heated air to the cab.

12. The air conditioning system of claim 1, wherein the compressor assembly comprises a compressor, the compressor and the electric motor comprising a common drive shaft.

13. The air conditioning system of claim 1, wherein the combination module is mountable on a roof of the vehicle.

14. The air conditioning system of claim 13, wherein the air handler is mountable to the ceiling of the cab.

15. A combination module for mounting in or on a vehicle, and for coupling to an evaporator coil such that refrigerant flows between the combination module and the evaporator coil, the combination module comprising: a condenser coil; and a compressor assembly, the compressor assembly comprising an electric motor, the combination module mounted inside the vehicle to cover a hole in a floor or outer wall of the vehicle, the condenser coil, when mounted, being positioned over the hole such that air entering through the hole ventilates the condenser coil, the compressor assembly further comprising a flow controller to control flow of the refrigerant, the flow controller of the compressor assembly coupled to the electric motor and comprising one of a variable speed control and a variable flow control, the compressor assembly further comprising a heat exchanger positioned between the flow controller and the electric motor, the heat exchanger receiving the refrigerant returning from the evaporator coil to cool the flow controller and the electric motor;
a fan mounted proximate to the hole to move air into the combination module;
a sensor for taking at least one of temperature measurements and pressure measurements of the refrigerant near the condenser coil; and
a fan controller to selectively activate the fan when it is determined that air flow in the combination module is insufficient as a function of at least one of: the temperature measurements, the pressure measurements, and a speed of the vehicle.

16. The combination module of claim 15, wherein the combination module is for mounting over a hole in the floor of the vehicle.

17. A method comprising: mounting a combination module in or on a vehicle, the combination module comprising: a condenser coil and a compressor assembly, the compressor assembly comprising an electric motor, the combination module mounted inside the vehicle to cover a hole in a floor or outer wall of the vehicle, the condenser coil, when mounted, being positioned over the hole such that air entering through the hole ventilates the condenser coil, the compressor assembly further comprising a flow controller to control flow of refrigerant, the flow controller of the compressor assembly coupled to the electric motor and comprising one of a variable speed control and a variable flow control, the compressor assembly further comprising a heat exchanger positioned between the flow controller and the electric motor, the heat exchanger receiving the refrigerant returning from at least one air handler to cool the flow controller and the electric motor,
a fan mounted proximate to the hole to move air into the combination module,
a sensor for taking one of temperature measurements and pressure measurements of the refrigerant near the condenser coil, and a fan controller to selectively activate the fan when it is determined that air flow in the combination module is insufficient as a function of at least one of: the temperature measurements, the pressure measurements and a speed of the vehicle;
mounting the at least one air handler in the vehicle remote from the combination module, each air handler comprising a respective evaporator coil; and
coupling each air handler to the combination module to allow the refrigerant to flow between the respective air handler and the combination module.

18. The method of claim 17, wherein mounting the combination module in or on the vehicle comprises mounting the combination module on a roof of the vehicle.

19. The method of claim 17, further comprising:
mounting at least one air handler to a ceiling of a cab of the vehicle, remote from the combination module, each air handler comprising a respective evaporator coil; and
coupling each air handler to the combination module to allow refrigerant to flow between the respective air handler and the combination module.

20. The air conditioning system of claim 7, wherein the air intake is a ram scoop.

21. The air conditioning system of claim 1, wherein the vehicle is a locomotive, a truck, or a work vehicle.

22. The air conditioning system of claim 1, wherein at least one of the temperature measurements and the pressure measurements comprise pressure measurements, and selectively activating the fan comprises activating the fan if a measured pressure of the refrigerant exceeds a pressure threshold.

23. The air conditioning system of claim 10, wherein the DC motor is a brushless DC motor.

24. The air conditioning system of claim 1, wherein the electric motor is configured to be powered by a DC power system of the vehicle.

25. The air conditioning system of claim 24, wherein the DC power system is one of: a 65 to 74 volt DC system; and a 12 to 24 volt DC system.

26. The air conditioning system of claim 1, wherein the compressor assembly is hermetically sealed.

27. The air conditioning system of claim 13, further comprising a fan mountable over the combination module and arranged to move air into the combination module.

28. The air conditioning system of claim 27, wherein the air handler is mountable to the ceiling of the cab.

29. The method of claim 17, wherein the hole is in the floor of the vehicle.

30. The air conditioning system of claim 17, further comprising:
    mounting at least one air handler to a ceiling of a cab of the vehicle, remote from the combination module, each air handler comprising a respective evaporator coil; and
    coupling each air handler to the combination module to allow the refrigerant to flow between the respective air handler and the combination module.

* * * * *